US008243286B2

(12) United States Patent
Palme et al.

(10) Patent No.: US 8,243,286 B2
(45) Date of Patent: Aug. 14, 2012

(54) DEVICE AND METHOD FOR THE CONTACTLESS DETECTION OF A THREE-DIMENSIONAL CONTOUR

(75) Inventors: Martin Palme, Jena (DE); Stefan Riehemann, Jena (DE); Peter Kühmstedt, Jena (DE); Christian Bräuer-Burchardt, Apolda (DE); Gunther Notni, Jena (DE)

(73) Assignee: Fraunhofer-Gesellschaft zur Forderung der Angewandten Forschung E.V. (DE)

( * ) Notice: Subject to any disclaimer, the term of this patent is extended or adjusted under 35 U.S.C. 154(b) by 428 days.

(21) Appl. No.: 12/445,798

(22) PCT Filed: Oct. 16, 2007

(86) PCT No.: PCT/EP2007/009164
§ 371 (c)(1),
(2), (4) Date: Aug. 19, 2009

(87) PCT Pub. No.: WO2008/046663
PCT Pub. Date: Apr. 24, 2008

(65) Prior Publication Data
US 2010/0046005 A1    Feb. 25, 2010

(30) Foreign Application Priority Data
Oct. 16, 2006 (DE) .......................... 10 2006 049 695

(51) Int. Cl.
*G01B 11/24* (2006.01)
(52) U.S. Cl. ....................................... 356/604
(58) Field of Classification Search .............. None
See application file for complete search history.

(56) References Cited

U.S. PATENT DOCUMENTS

| | | | |
|---|---|---|---|
| 4,842,411 A | 6/1989 | Wood | |
| 5,104,216 A | 4/1992 | Vokurka | |
| 5,257,184 A | 10/1993 | Mushabac | |
| 5,307,151 A | 4/1994 | Hof et al. | |
| 5,561,526 A | 10/1996 | Huber et al. | |
| 6,522,777 B1 * | 2/2003 | Paulsen et al. | 382/154 |
| 6,956,963 B2 * | 10/2005 | Ulrich et al. | 382/154 |
| 6,996,339 B2 | 2/2006 | Miyoshi et al. | |
| 2002/0044682 A1 | 4/2002 | Weil et al. | |
| 2003/0072011 A1 | 4/2003 | Shirley | |

FOREIGN PATENT DOCUMENTS

DE         10149750 A1      9/2002
(Continued)

OTHER PUBLICATIONS

Munkelt C; Kuhmstedt P; Heinze M et al., "How to detect object-caused illumination effects in 3D fringe projections" Proceedings of SPIE, Bd. 5856, Jun. 13, 2005, p. 632-639.

(Continued)

*Primary Examiner* — Tu Nguyen
(74) *Attorney, Agent, or Firm* — Young Basile

(57) ABSTRACT

The invention relates to a device for the contactless detection of a three-dimensional contour, comprising a projector with an imaging element and a projection lens for depicting a stripe pattern that is generated on the imaging element in an object space. The invention further comprises a camera arrangement for the surveillance of the object space from two different directions, having two camera lenses. The projector and the camera arrangement are housed together in a measurement head that can be handheld. The invention further relates to a method for detecting a three-dimensional contour using said device.

15 Claims, 7 Drawing Sheets

FOREIGN PATENT DOCUMENTS

| | | |
|---|---|---|
| DE | 102004052199 A1 | 10/2004 |
| DE | 10344051 A1 | 4/2005 |
| EP | 1431803 A2 | 6/2004 |
| WO | 2006/094409 | 9/2006 |

OTHER PUBLICATIONS

Schreiber W. et al, "Theory and arrangements of self-calibrating whole-body three-dimensional measurement systems using fringe projection technique", Optical Engineering, Soc. of Photo-Optical Instrumentation Engineers. Bellingham bd. 39, Nr. 1, Jan. 1, 2000, pp. 159-169.

English Translation of the International Preliminary Report on Patentability (Chapter I), mailed May 14, 2009.

Song Zhang and Shing-Tung Yau, High-resolution, real-time 3D absolute coordinate measurement based on a phase-shifting methodOptics Express 2644, Apr. 3, 2006.

* cited by examiner

DEVICE AND METHOD FOR THE CONTACTLESS DETECTION OF A THREE-DIMENSIONAL CONTOUR

FIELD OF THE INVENTION

The present invention relates to a device for the contactless detection of a three-dimensional contour, having a projector and a camera arrangement which includes two camera lenses. The invention relates in addition to a corresponding method for the contactless detection of a three-dimensional contour, in which at least one stripe pattern is projected onto an object.

BACKGROUND

It is known from the state of the art, in the case of comparable methods, to project a so-called Gray code onto the object together with the stripe pattern which makes it possible to identify individual pairs of lines of the stripe pattern in images of the stripe pattern recorded on the object and thus to identify image points associated with specific object points, which enables triangulation for detection of a three-dimensional contour of the object. A disadvantage of methods of this type according to the state of the art resides in the fact that, because of the projection of relatively comprehensive information onto the object, a large number of recordings is required. This militates in particular against use of such methods in hand-held devices. The object therefore underlying the present invention is to propose a device and a corresponding method for the contactless detection of a three-dimensional contour, which avoid the mentioned disadvantages and, in particular with respect to an intraoral or extraoral detection of tooth surfaces or surfaces of tooth models or dentures, allow manual handling at least of one measuring head which is used.

SUMMARY

Detection of a contour in a hand operation is made possible by the proposed device for the contactless detection of a three-dimensional contour in that the latter comprises a projector with an image-producing element and a projection lens for imaging a stripe pattern which can be generated on the image-producing element into an object space and also a camera arrangement which includes two camera lenses for observing the object space from two different directions, the projector and the camera arrangement being accommodated together in one measuring head which can be used as a hand-held device.

A particularly maneuverable embodiment can thereby be achieved if the camera arrangement has a common camera chip for both camera lenses, each of the camera lenses producing an image on respectively one half of the camera chip. This can be achieved in turn by a folded beam path, for example in that two tilted mirrors are provided for each camera lens. The camera chip can concern for example a CCD. Correspondingly, also two CCDs can be used in embodiments with two camera chips.

By using two camera lenses, a triangulation of a point in the object space is also possible when a projection direction of individual pairs of lines of the stripe pattern is a priori not precisely known. Rather, identification of image points of the same absolute phase suffices. In order, on the one hand, to be able to triangulate sufficiently precisely and, on the other hand, to be able also to measure steep edges, the camera lenses can advantageously be disposed such that they have optical axes which enclose an angle of between 5° and 20°.

With respect to as compact a construction as possible and a triangulation geometry which can be surveyed as much as possible, it is advantageous if the optical axes of the two camera lenses are disposed in mirror symmetry relative to a plane in which the optical axis of the projection lens is situated. Advantageously, all three optical axes can be situated in one plane. However, it is also possible that the optical axis of the projection lens is tilted by an angle of 5° and 8° from a plane spanned by the optical axes of the camera lenses.

In order that the device, on the one hand, also conveniently allows intraoral measurement and, on the other hand, is both sufficiently compact and enables sufficiently precise triangulation, the camera lenses and/or the projection lens can have an object-side sectional width of between 7 cm and 13 cm. It can thereby be provided that a beam path between the object and the camera lenses or the projector lens is folded, for example with a tilted mirror or two tilted mirrors. At least one advantageously at least 7 cm long housing end of the measuring head can be designed with a height of less than 2.5 cm in order to allow an intraoral measurement.

In addition, the device can have a light source for the projector, which light source can be accommodated in the measuring head or connected to the measuring head via a light guide. The image-producing element can thereby be configured such that it modulates light emanating from this light source reflectively or transmissively in the intensity thereof. In particular, the image-producing element can concern an LCoS chip or a normal LCD or a different image-producing element which can be actuated pixel-wise. The device can finally include in addition a control and evaluation unit for actuating the image-producing element and for evaluating image data produced by the camera arrangement. The control and evaluation unit can thereby be installed with programming technology in order to generate at least one stripe pattern on the image-producing element and also in order to evaluate phase values determined by the camera arrangement along mutually corresponding epipolar lines in image planes of both camera lenses with respect to the constancy of their course, in order to divide the epipolar lines into intervals of a constant phase course, in order to identify mutually corresponding intervals in the mutually corresponding epipolar lines, in order to identify mutually corresponding image points of the same phase values within the mutually corresponding intervals and in order to triangulate an object point based on the image points which correspond to this object point and correspond to each other. The control and evaluation unit should thereby preferably be configured in addition such that a sequence of a plurality of mutually phase-shifted stripe patterns and/or in addition at least one stripe pattern with stripes orientated in a different direction can be generated.

The proposed method for the contactless detection of a three-dimensional contour which can be implemented for example with a device of the previously-described type provides that at least one stripe pattern is projected onto an object and, by means of two camera lenses which are disposed at a defined spacing relative to each other, two images of the object with the stripe pattern projected thereon are recorded from two different direction, and phase values of the stripe pattern are determined for image points in both images, after which, by means of triangulation based on respectively mutually corresponding image points in the two images, depth information for an object point corresponding to these image points is determined. In order to determine the mutually corresponding image points in the two images, respectively mutually corresponding epipolar lines in the two images are thereby selected and, along these epipolar lines, the determined phase values are evaluated with respect to constancy and the epipolar lines are hence divided into intervals of a constant phase course. This can take place for example by means of constancy algorithms which are known per se, e.g. in that phase values which were recorded with mutually adjacent pixels, are checked thereupon—if necessary with observation of the phase values modulo $2\pi$—as to whether they differ by no more than a defined small value. Finally, the mutually corresponding intervals in the mutually corresponding epipolar lines are identified, which can take place for example by comparison of the number of periods contained in the different intervals and, within the mutually corresponding intervals, points of the same phase values are mutually assigned. This is again possible now without difficulty because the phase values within the mentioned intervals are made constant. Thus before evaluation thereof with respect to constancy, the phase values can also be termed crude phase values which—during parameterisation of a period of 0 to $2\pi$—have only one information content modulo $2\pi$, whilst the phase values after division of the epipolar lines into intervals of a constant phase course, i.e. after being made constant, can be termed fine phases. The mentioned pairs of mutually corresponding epipolar lines can be defined respectively as images of all the points from one plane which extends through the projection centres of both camera lenses. These projection centres can also serve for definition of the parallaxes during triangulation. Both the mentioned projection centres and the epipolar lines are produced unequivocally from a geometry chosen for the device used.

The method can be substantially simplified in that a sequence of a plurality of mutually phase-shifted stripe patterns is projected in succession onto the object and recorded for determining the phase values. Preferably at least three, or better at least four, mutually phase-shifted stripe patterns are projected onto the object for determining a set of phase values. In order to permit, on the one hand, as good resolution as possible and, on the other hand, to make identification of the individual pairs of lines or fine phases not unnecessarily difficult, it can be provided that the stripe pattern used has between 10 and 80 pairs of lines, i.e. intensity periods. It is advantageous to use a stripe pattern which has stripes orientated perpendicular to a combination of the projection centres of the two camera lenses. The identification of mutually corresponding image points can be simplified furthermore in that in addition a further stripe pattern with differently orientated stripes is projected onto the object in a temporally offset manner, phase values also of this further stripe pattern being evaluated. This further stripe pattern then has therefore, relative to the stripes of the first-mentioned stripe pattern or the corresponding stripe pattern sequence, rotated stripes. Possibly, again respectively a whole sequence of further stripe patterns which are rotated in this manner and mutually phase-shifted can also be projected onto the object and recorded. With respect to as simple as possible identification of mutually corresponding image points, on the one hand, and altogether as short as possible a recording time, on the other hand, it is advantageous to record in total between five and eleven images with stripe patterns.

Finally, in addition to the recordings with stripe patterns or even better with a stripe pattern recording at the same time (by embedding in the stripe pattern or patterns), a recording or a plurality of recordings of the object can be provided by means of the two camera lenses, in the case of which at least one marking which is located in a defined manner relative to the previously, simultaneously or subsequently recorded stripe pattern is projected onto the object, an object point marked in this way being able to be triangulated. An additional recording of such locatable markings can serve for unequivocal identification of two corresponding image points in order to assist the method. The markings can therefore be recorded as separate images or mixed with the stripe images and recorded simultaneously.

Alternatively or additionally, such a projection and triangulation of a marking or a plurality of markings can also serve for calibration of a device used for the method. Such a calibration can—for determination both of inner parameters of the device and the relative orientation of the two camera lenses—be effected during the measurement of the object itself or also in advance by means of another object (a test body). However, calibration can be effected—in particular when using a test body—also with one or more stripe image recordings and, since a calibration measurement can last longer, possibly also using a Gray code projection or with comparable methods.

The epipolar lines selected in the method and evaluated with respect to the phase course should preferably be situated densely in the images produced by the two camera lenses. It is meant by this that narrow surrounding stripes of these epipolar lines should cover the two images in order to make possible a 3D detection covering the surface.

In an advantageous embodiment of the method, it can be provided that, by means of interpolation of detected phase values, a subpixel-precise assignment, with respect to the image-producer and/or the camera chips or the camera chip, of image points to phase values is effected.

In order to enable a measurement with a measuring head guided by hand without measuring errors due to shaking, it can be provided that all the stripe patterns used for detection of one contour and possibly markings projected additionally or simultaneously are recorded within a time interval of between 100 ms and 500 ms and/or with an image repeat rate of between 15 Hz and 60 Hz are recorded.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
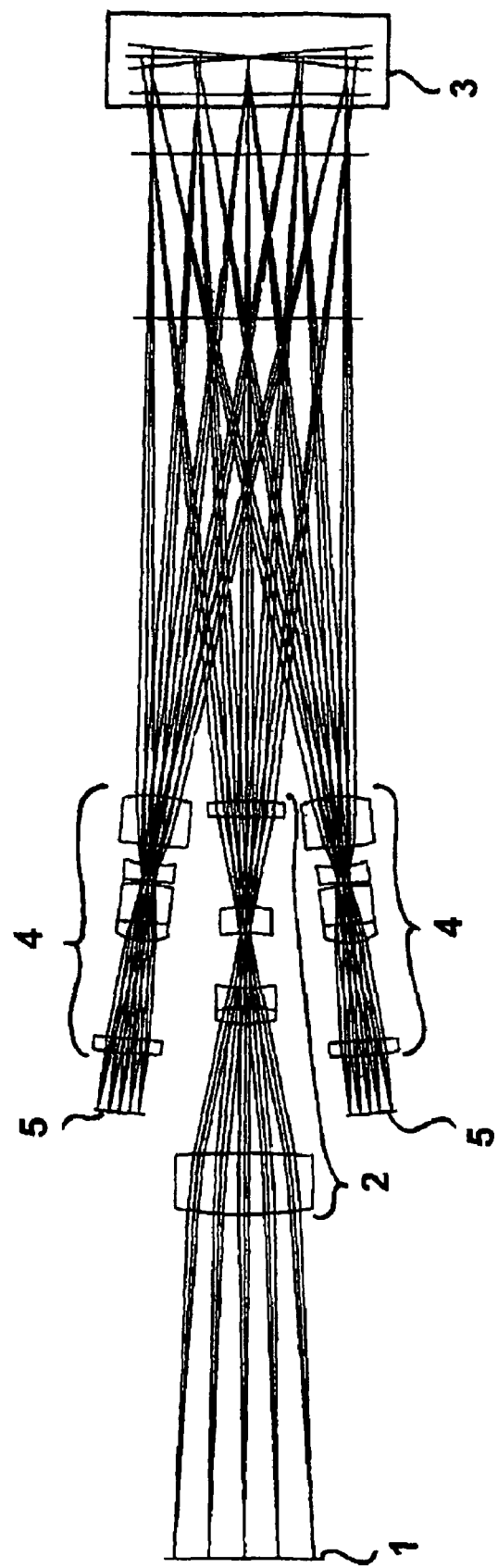
FIG. 1 is a perspective view of a beam path of a device according to the invention.

Optical components of a device for contactless detection of a three-dimensional contour, in particular for intraoral or extraoral detection of tooth contours, can be detected in FIG. 1. The illustrated device includes a projector with an image-producing element 1 and a projection lens 2 for imaging a stripe pattern which can be generated on the image-producing element 1 into an object space 3. The device includes furthermore two camera lenses 4 which belong to a camera arrangement with which the object space 3 can be observed from two directions which are mutually tilted by an angle of approx. 12°. The projector and the camera arrangement, which here has respectively one camera chip 5 configured as a monochrome CCD chip for each of the camera lenses 4, are thereby accommodated in a common measuring head which can be used as a hand-held device.

The projector is disposed in the case of the illustrated device such that it has an optical axis which is congruent with a bisecting line between two optical axes defined by the camera lenses 4. Both the camera lenses 4 and the projection lens 2 have an object sectional width of approx. 10 cm. The object space 3, into which projection can take place in focus and which is encompassed by a depth of focus range of the camera arrangement, has lateral dimensions of approx. 25 mm×15 mm and a depth in the direction of the optical axis of the projector of approx. 13 mm.

The image-producing element 1, which concerns here an LCoS chip, has lateral dimensions of approx. 6 mm×4 mm up to 16 mm×12 mm. The image-producing element 1 here serves for reflective intensity modulation of light which emanates from a light source which is itself not illustrated in FIG. 1. Alternatively, also a normal LCD chip could be provided, which chip modulates light of a light source transmissively.

Figure 2:
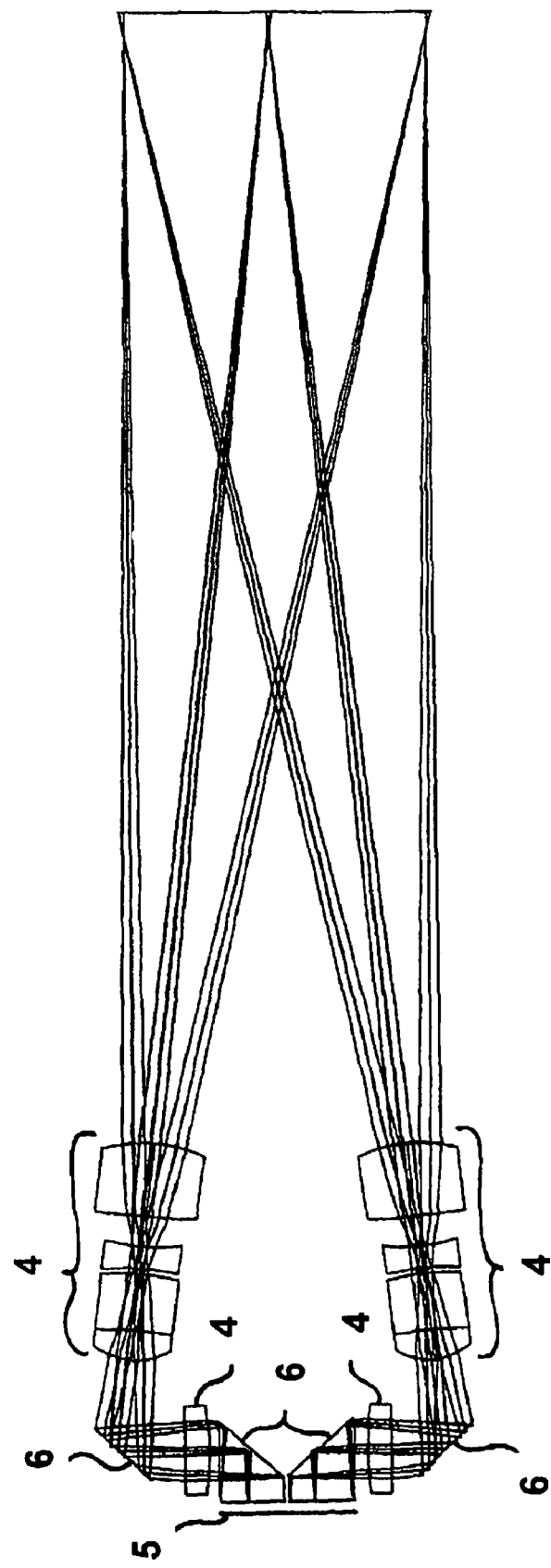
FIG. 2, in a corresponding representation, is a perspective view of a beam path of two camera lenses of a comparable device in a different embodiment of the invention.

In FIG. 2, another embodiment of the invention is represented, here only the camera arrangement of the corresponding device being illustrated. Recurring features, as also in the following Figures, are provided here again with the same reference numbers. Deviating from the above-described embodiment, this camera arrangement has only one single camera chip 5 which again concerns a monochrome CCD chip, the beam paths of both camera lenses 4 being folded by respectively two tilted mirrors 6 on the image side such that each of the camera lenses 4 produces an image on respectively one half of the camera chip 5. It can be provided that the beam path of the projector, in the embodiment represented in FIG. 2, is tilted by an angle of approx. 5° from a plane defined by the optical axes of the camera lenses 4. Apart from that, as symmetrical an arrangement as possible of the projection beam path is also provided.

Figure 3:
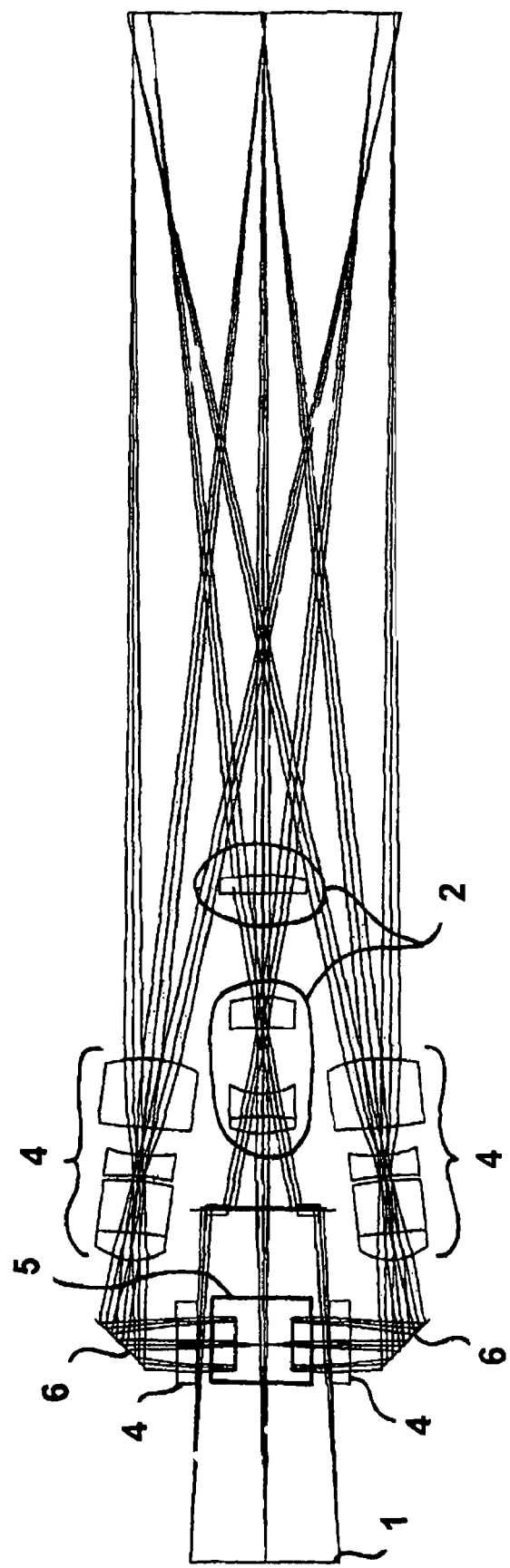
FIG. 3, in a comparable representation, is a perspective view of a beam path of a third embodiment of a device according to the invention.
Figure 4:
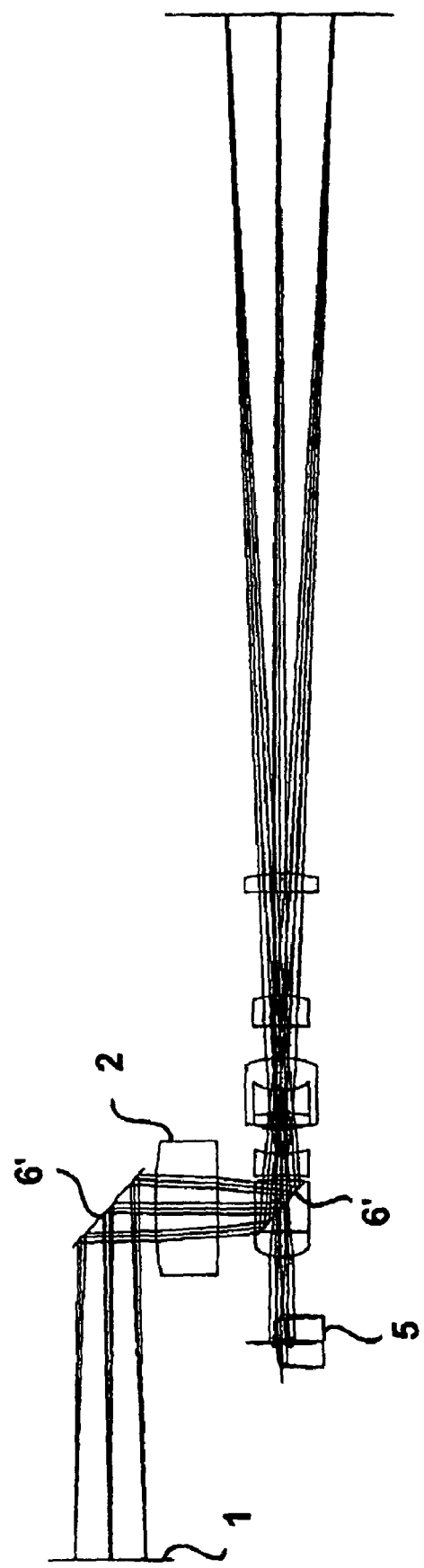
FIG. 4 is a side view of the beam path of the device of FIG. 3.

A third embodiment is represented finally in FIGS. 3 and 4. Here also, the camera arrangement has for both beam paths only one single camera chip 5, the two halves of which can be exposed by respectively one of the camera lenses 4. The camera chip 5 is disposed here parallel to a plane defined by the optical axes of the camera lenses 4. As can be detected in FIG. 4, the projector in this embodiment also has a beam path folded by two tilted mirrors 6'.

Figure 5:
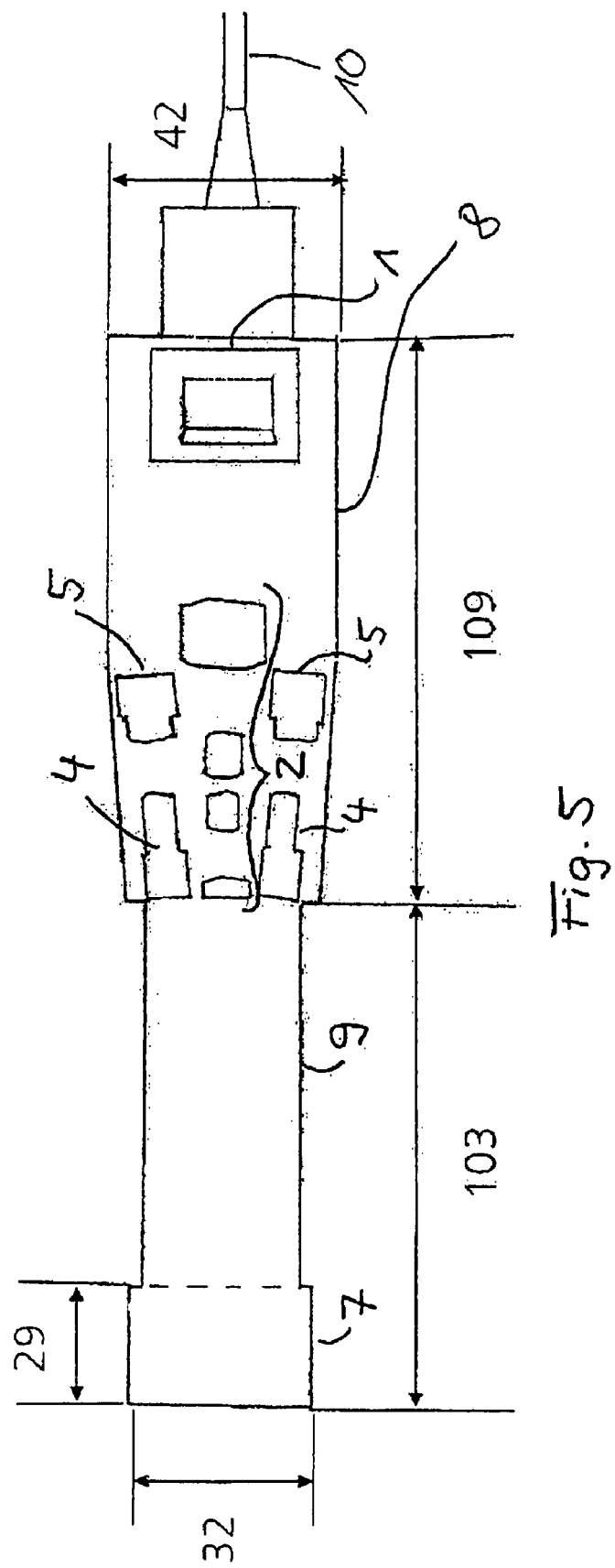
FIG. 5 is a device according to the invention represented with an opened housing, having a beam path comparable to the embodiment of FIG. 1.

In FIG. 5, an embodiment of the invention is illustrated, which differs from the embodiment represented in FIG. 1 merely in that a tilted mirror is provided on the object side in order to facilitate in particular intraoral measurements. A housing of the measuring head of the device with a relatively narrow housing end 9 which carries the tilted mirror 7 is also represented in FIG. 5. Number references introduced in FIG. 5 designate measurements of the housing 8 in mm. The illustrated device has a light source which is disposed outwith the housing 8 and is not illustrated in FIG. 5, said light source being connected via a light guide 10 of a diameter of approx. 5 mm to the measuring head. In a modification of the invention, it can be provided that a light source is accommodated instead in the measuring head itself.

In FIGS. 1 to 5, a control and evaluation unit which belongs to the respective device is not illustrated, said control evaluation unit being installed with programming technology such that the device is suitable for implementing a method which is described subsequently with reference to FIG. 6.

This method serves for contactless detection of a three-dimensional contour, in particular an intraorally or extraorally scanned surface of teeth, tooth models or dentures. In the case of the method, a sequence of stripe patterns is firstly projected by the projector onto the object, the three-dimensional contour of which object is intended to be detected, two images of this object with the stripe pattern projected respectively thereon being recorded with the camera lenses 4. Firstly, for example four stripe patterns which differ from each other merely by a shifted phase in the local space are thereby projected and recorded so that, with a so-called 4-phase algorithm (of course in other embodiments of the method also another suitable phase algorithm can be used) for each of the two images, phase values of the stripe pattern or of the stripe pattern sequence are determined, as a result of which for instance crude phase images are produced. This is possible without difficulty in that, for recording each of the stripe patterns from the sequence, intensities on each pixel of the respective camera chip 5 are measured. There are thereby termed as crude phases intensity phases which—with a parameterisation of an intensity period of 0 to $2\pi$—only modulo $2\pi$ are acceptable.

Figure 6:
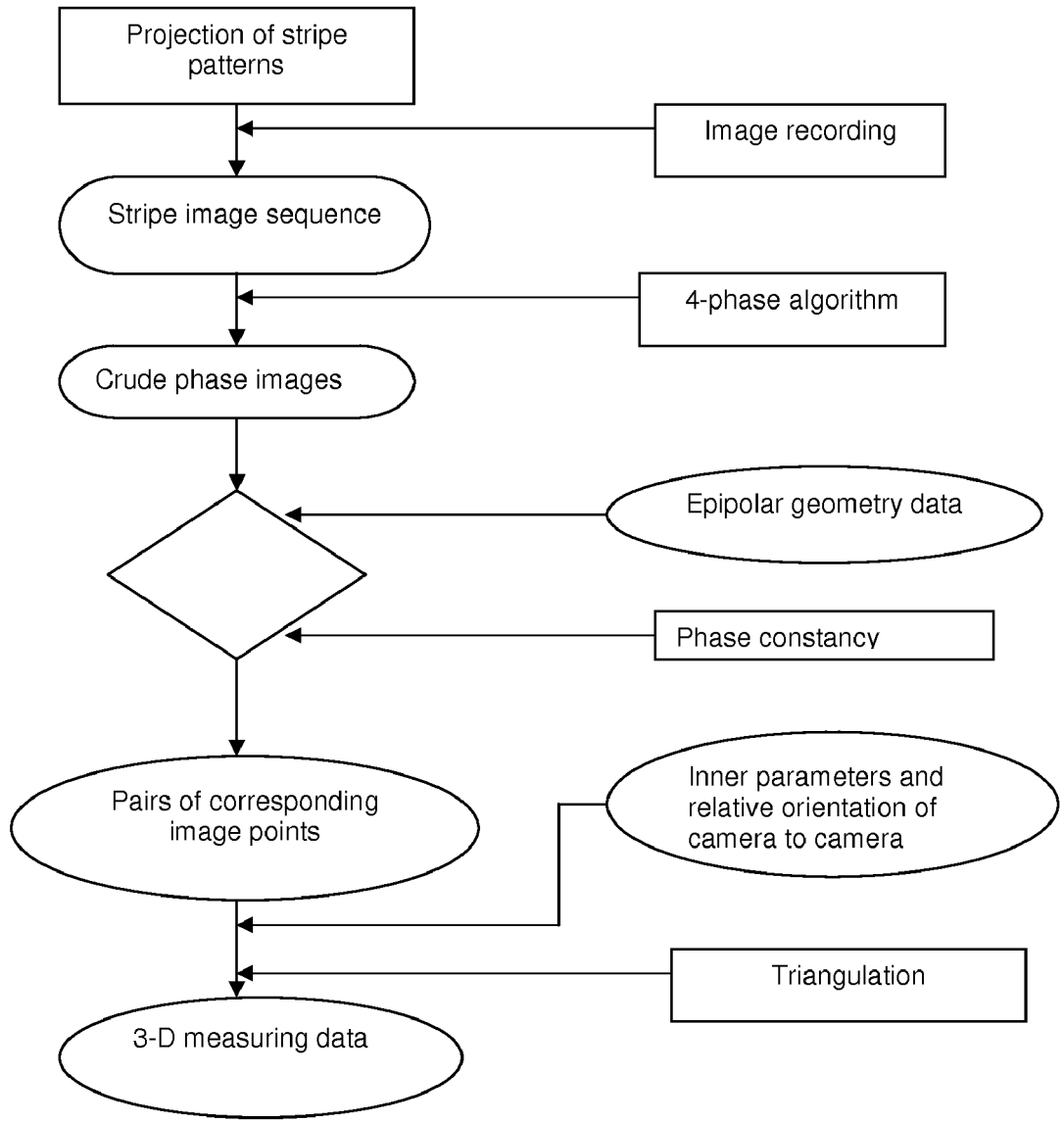
FIG. 6 is a flow chart for representing an embodiment of a method according to the invention.

In a further step which is represented in FIG. 6 as a rhombus, now mutually corresponding image points in the two images recorded by the camera lenses 4 are determined in that mutually respectively corresponding epipolar lines in the two images are selected, the determined phase values along the epipolar lines are tested with respect to constancy and the epipolar lines are hence divided into intervals of a constant phase course, after which mutually corresponding intervals in the mutually corresponding epipolar lines are identified and, within the mutually corresponding intervals, points of the same phase values are mutually assigned. The phase values within the mentioned intervals can thereby by termed fine phases to which a content of information is sent by means of a phase constancy which is undertaken, said content of information sufficing for unequivocal identification of each point in this interval. The phase constancy, i.e. the evaluation of the phase values along the epipolar lines with respect to constancy and the division of the epipolar lines into intervals of a constant phase course, can thereby take place by means of constancy algorithms which are known per se. Preferably, the pairs of epipolar lines are selected such that they cover both images as densely as possible. The determination of mutually corresponding epipolar lines is thereby possible without difficulty because the epipolar lines are produced unequivocally for each image point in each of the images.

Finally, based on respectively mutually corresponding image points in the two images which are produced by the two camera lenses 4, depth information for an object point corresponding to these image points is determined by triangulation. In FIG. 6, technical or computing processes are illustrated by correspondingly labelled rectangular fields, input or output data by correspondingly labelled oval fields.

The stripe patterns used are dimensioned such that approx. 50 equidistant periods cover the object space 3 illustrated in FIG. 1. It is provided that a sequence of stripe patterns is produced with stripes which are orientated perpendicular to the drawing plane in FIGS. 1 to 3. In addition, between one and seven further stripe patterns with other orientations are intended to be projected onto the object and correspondingly evaluated in order to assist the method. It can be provided that, additionally or simultaneously, at least one recording is made in which unequivocally located markings are projected onto the object, which can assist in the method likewise in a supporting manner in the identification of mutually corresponding image points.

In the described manner, so many epipolar lines should be examined that surrounding stripes of these epipolar lines which have a width of up to four times the pixel spacing cover the images completely. By interpolation of measured intensities, an assignment of image points to phase values which is even more than pixel-precise and correspondingly a very precise triangulation of the contour can thereby be effected. By using a rapidly operating four-phase algorithm for the phase calculation, the recording time of the image sequence with the stripe patterns is kept low. For recording sequences of for example 8 to 10 images, at a duration of 20 ms to 40 ms per image, for example recording times of between 160 ms and 400 ms per measuring position can be produced. With respect to an intraoral application, it can be advantageous finally if the device used has a modular measuring head or sensor head with a removable mouth piece.

Essential features of the invention described here are moreover in particular a crude phase determination from intensity images which are recorded with two cameras from two different directions, and also a calculation of three-dimensional data with recourse to epipolar geometry, constancy of crude phases, determination of corresponding pixels via phase correlation and calculation of depth values by triangulation based on corresponding pixels.

A preferred embodiment of the proposed invention is described subsequently again in summary.

The device to be termed hand scanner is a device for scanning teeth in the interior of the mouth. It comprises a part which is introduced into the mouth and a hand part with the optical, electronic and mechanical components which produce transmission of the illumination beams from the illumination source via the illumination optics to the tooth and transmission of the observation beams from the tooth to the observation optics up to the sensor (CCD).

The device contains as image-producing element 1 a projection chip which projects a sequence of stripe patterns onto the measuring object (tooth). This stripe pattern sequence is observed and recorded from two observation directions. Phase values are calculated from the recorded intensity images. The 3D measuring data are obtained by phasogrammetric methods via a phase correlation by means of triangulation between the two observation channels, see e.g. FIG. 1.

The principle which produces at the same time two observation directions and an illumination direction includes two separate optical channels for observation, the axes of which are disposed to the left and right typically almost symmetrically relative to the illumination direction.

An off-plan angle, possibly present, between the optical axis of the projection and the plane which is defined by the two optical axes of the cameras is preferably less than 5°.

By illumination and observation, a measuring field of laterally approx. 25 mm×15 mm is produced. The extension of the object space 3 or of the measuring volume in the direction of the optical axis (depth of focus range) is approx. ±6.5 mm=13 mm.

An offset cold light source serves as illumination source. The light of the (offset) source is coupled via a liquid light guide of a diameter of approx. 5 mm into the intraorally operating sensor head or measuring head.

The illumination optics are designed such that they operate in a low-distortion manner. For the observation, CCD camera technology and almost distortion-free lenses are used. It is possible to combine the two observation directions in such a manner that only one camera chip 5 is used for the observation (see FIGS. 2 to 4). As an alternative, also two camera chips 5 can be used (see FIG. 1).

In order to obtain the measuring values, phasogrammetry as basic measuring principle is used as the method. The method of phasogrammetry represents the mathematically unified amalgamation of the method of photogrammetry with the active pattern projection.

Pattern sequences of a different orientation are projected onto the object to be measured and are recorded by the observing cameras, fine phase values being determined by corresponding algorithms. From correlating fine phase values of two observation directions, the parameters of the inner orientation of the device and of the relative orientation between the observation directions, the 3D measuring values are generated.

The parameters of the inner orientation and the relative orientation between the observation directions are determined within the scope of a calibration measurement. This can be determined either from the data of the measurement itself or else a priori by a separate calibration measurement with higher precision. For this purpose, one or more extraoral measurements of a calibration body are implemented with the highest precision. In order to produce the crude phase images (=phase modulo $2\pi$) during the calibration, e.g. a 4- or 16-phase algorithm is used. Determination of the inner orientation of the cameras and possibly of the projector is effected with photogrammetric methods. Furthermore the relative orientation between the two observation directions can be determined from the calibration measurement.

In order to calculate the 3D measuring data, the beam bundles defined by the observation directions are used and a phase correlation in the camera image is implemented. The recording of the image sequence is effected in the first step.

Two intersecting sequences of in total five to eleven images of stripe patterns are projected by the projection unit and recorded from both observation directions. The image recording at an image repeat rate of 30 Hz requires between 160 and 370 ms.

Crude phase images are calculated for each observation direction by means of a phase algorithm. In one or more of the images, one or more image points can be used as markings or markers. Markers are unequivocally identifiable points in the image, the origin of which is known on the projection chip. They serve for producing the absolute phase determination.

In the second step, the assignment of the points between the camera images is effected.

For the 3D point calculation, the crude phase images must be converted into fine phase images in order to achieve an unequivocal point assignment between the images of the two cameras. The assignment of the image points of both observation directions is effected with the help of the crude phase information and the epipolar geometry.

For this purpose, only image points which are situated on corresponding epipolar lines in the images of both observation directions are observed. These lines are determined unequivocally by the selection of specific points in an image and the data of the inner and the relative orientation.

In order to produce an adequate selection of measuring points, the images are covered correspondingly densely with corresponding epipolar line families. Epipolar lines are images of planes in space which extend through the projection centres of the two observation directions and a point in the object space characterising this spatial plane. Hence they are illustrated in the images as corresponding straight lines.

All the points on the epipolar line of an image have their corresponding points on the corresponding epipolar line in the second image. The object of finding point correspondences is hence reduced to the one-dimensional case.

Finding the correspondences is effected via the correlation of the phase values on the epipolar lines. For this purpose, another constancy of the crude phase values on the epipolar lines is required. This is achieved by analysis of the period transitions, detection of non-constancy points, observation of adjacent image points and tracking of period transitions in the image. The detected markers hereby serve as starting points for tracking in the image and as control point.

Calculation of the 3D measuring data is effected in the third step.

For this purpose, the subpixel-precisely determined coordinates of corresponding image points together with the relative orientation and the parameters of the inner orientation are calculated by means of triangulation to form a 3D point cloud which represents the end result of the scanning process.

Constancy of the crude phase is therefore required for the illustrated method. This crude phase constancy need no longer be effected in a two-dimensional surface when using epipolar geometry but instead is reduced to a one-dimensional problem in that corresponding straight lines are observed in both images.

An unequivocal crude phase assignment can be achieved in any case when corresponding start points are found on two portions of the straight line in both images and as long as the function of the phase values on the straight line portions remains constant. Points of inconstancy define new straight line portions. For each pair of corresponding straight line portions on corresponding epipolar lines, a corresponding point must therefore be found. (Recourse can thereby be made again also to constancy analyses of phase values between adjacent epipolar lines). The algorithm for point assignment (constancy of the crude phase) breaks down corresponding epipolar lines into constant portions and finds corresponding start points in respectively corresponding portions.

When using a 1-chip solution for the camera arrangement (see FIGS. 2-4), the epipolar geometry is calculated correspondingly between the two partial channels of the camera. Thus not only can a compact construction be achieved but also a simpler electronic evaluation system can be used.

Figure 7:
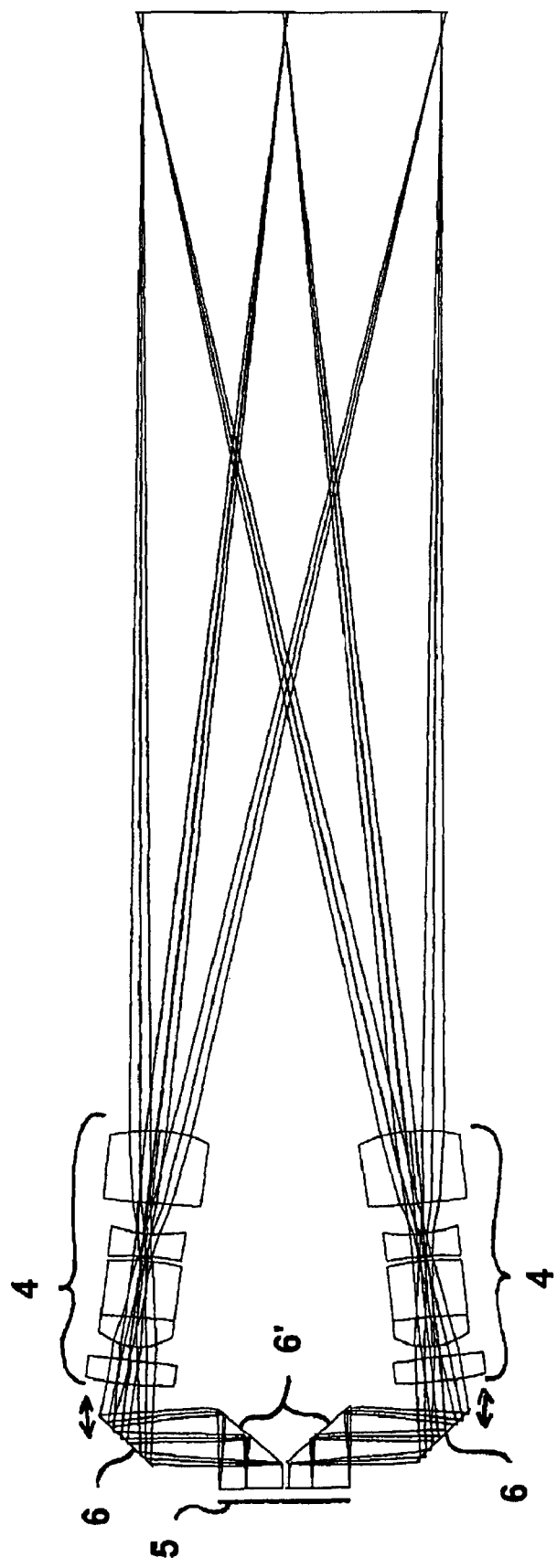
FIG. 7, in a representation corresponding to FIG. 2, is a perspective view of the beam path of two camera lenses in a modification of the device represented there.

Finally, parts of a device for contactless detection of a three-dimensional contour are shown in a further embodiment of the invention in FIG. 7. The representation thereby corresponds extensively to FIG. 2. Corresponding features for which that already stated above applies are again provided with the same reference numbers. Only the deviations relative to the embodiment of FIG. 2 are intended to be dealt with here.

In the beam path of both camera lenses 4, respectively one first tilted mirror 6 and a second tilted mirror 6', viewed from the object space, which correspond to the in total four tilted mirrors 6 of FIG. 2 are disposed as tilted elements. Differently from the embodiment of FIG. 2, all the lenses of the camera lenses 4 here are placed on the object side of both tilted mirrors 6 and 6' which are disposed in the respective beam path and hence on the object side of all tilted elements out of the beam paths of the camera lenses 4, whilst a diffractive element is no longer disposed here between the first tilted mirror 6, viewed from the object space, and the second tilted mirror 6'. This facilitates adjustment of the camera optics by displacing and/or rotating the first tilted mirrors 6 which are mounted for this purpose respectively on a slide which is displaceable in the direction of a double arrow illustrated in FIG. 2 and can be fixed by screwing down in a desired position. On this slide, respectively one of the two first tilted mirrors 6 is rotatable about an axis perpendicular to the drawing plane of FIG. 2 and disposed so as to be fixable in a desired position.

This design confers the crucial advantage that adjustment of the camera lenses 4 is possible by adjustment of the first tilted mirrors 6 without changing an inner geometry of the image-producing elements of the camera lenses 4, i.e. here the respectively five detectable lenses. The adjustment therefore does not change the imaging quality of the camera lenses 4 in an advantageous manner. In addition, a prism block formed from the two second tilted mirrors 6' can possibly be disposed on a linear slide and be configured to be displaceable in the direction of the axis of symmetry or optical axis of the camera chip 5 for adjustment purposes. Of course, also the embodiment of FIGS. 3 and 4 can be modified in a corresponding manner so that all the lenses of the camera lenses 4 are disposed on the object side of the tilted mirrors 6 and the tilted mirrors 6 can be adjusted in the manner described here.

The illumination optics of the projector, not illustrated in the Figures, with which light is directed onto the image-producing element 1 which is configured for example as an LCoS chip is preferably configured telecentrically in order to produce as high a radiation output as possible.

With devices of the above-described type, three-dimensional contours can also be detected in a contactless manner with alternative methods, in particular by a projection of stripe patterns with Gray codes. For this purpose, the control and evaluation unit can be installed with programming technology in order to actuate the image-producing element 1 and in order to evaluate image data of the respective device which are produced by the camera arrangement in order to generate stripe patterns which contain Gray codes on the image-producing element 1, in order to identify mutually corresponding image points in images produced by the two camera lenses by evaluation of the Gray code and in order to triangulate an object point based on the image points which correspond to this object point and are identified as correlating with each other.

In a corresponding method for the contactless detection of a three-dimensional contour, stripe patterns containing for instance Gray codes are projected onto an object and, by means of two camera lenses which are disposed at a defined spacing relative to each other, two images of the object with the stripe pattern projected thereon are recorded from two different directions, and phase values of the stripe pattern are determined for image points in both images, after which, by means of triangulation based on respectively mutually corresponding image points in the two images, depth information for an object point corresponding to these image points is determined, the mutually corresponding image points in the two images being determined by evaluation of the Gray codes.

It is thereby provided that—e.g. by corresponding programming of the control and evaluation unit at least—at least a first set and a second set of stripe patterns are projected, for a measurement, with respectively parallel stripes, the stripes of the first set enclosing with the stripes of the second set a non-vanishing angle, preferably an angle of at least approx. 90°, and each set including a quantity of at least three, preferably exactly four, mutually phase-shifted stripe patterns with a sinusoidal intensity course, which in fact allow alone a determination of a phase mod $2\pi$, each set comprising in addition further stripe patterns which are Gray-coded for determining an absolute phase.

Hence in total a relatively large number of stripe patterns is projected and recorded. In order to avoid shaking due to a relatively long measuring time which is associated therewith, in particular when using a hand-held device for projecting and recording the stripe patterns, a particularly preferred embodiment of the invention now provides that the quantity of stripe patterns with a sinusoidal intensity course from the first set of stripe patterns and the quantity of stripe patterns with a sinusoidal intensity course from the second set of stripe patterns are projected immediately in succession, whilst the Gray-coded stripe patterns are projected before and/or after the two mentioned quantities of stripe patterns with a sinusoidal intensity course but not between individual ones of the stripe patterns with a sinusoidal intensity course. The stripe patterns with a sinusoidal intensity course from the first set of stripe patterns and the stripe patterns with a sinusoidal intensity course from the second set of stripe patterns can thereby possibly be projected in any sequence, for example a projection initially of all these stripe patterns from the first and then the stripe pattern extending sinusoidally from the second set is possible.

It is achieved by this measure that the stripe patterns with a sinusoidal intensity course—these are typically in total eight stripe patterns in the case of two stripe directions, possibly also six of these stripe patterns being able to suffice—are able to be projected and recorded within a very short and hence shaking-proof time span. The Gray-coded stripe patterns in fact then fall out of this very short time span which is however non-damaging because they still serve only for determining the absolute phase of an already known mod $2\pi$ phase and their recording is hence not nearly so sensitive to shaking. Advantageously, the unequivocal assignment of image points in the image planes of the two camera lenses by projection of Gray codes can be combined with a shaking-proof operation of the corresponding device also as a hand-held device.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

We claim the following:

1. A device for the contactless detection of a three-dimensional contour comprising:
    a projector with an image-producing element and a projection lens for imaging a stripe pattern which can be generated on the image-producing element in an object space; and
    a camera arrangement which includes two camera lenses for observing the object space from two different directions, wherein the projector and the camera arrangement are configured together in one measuring head which can be used as a hand-held device,
wherein the camera arrangement has a common camera chip for both camera lenses, each of the camera lenses producing an image on respectively one half of the camera chip, and wherein at least two tilted elements are disposed in a beam path of each of the two camera lenses, all the lenses of the camera lenses being disposed on an object side of the tilted elements and at least one first tilted element of the tilted elements in the beam path of each of the two camera lenses being disposed on a displaceable slide for adjustment.

2. The device according to claim 1, wherein the two camera lenses have optical axes which enclose an angle of between 5° and 20°.

3. The device according to claim 1, wherein the two camera lenses have optical axes which are disposed in mirror symmetry relative to a plane in which an optical axis of the projection lens is situated.

4. The device according to claim 1, wherein at least one of the camera lenses and the projection lens is designed for an object-side sectional width of between 7 cm and 13 cm.

5. The device according to claim 1, wherein a light source is provided for the projector, light emanating from the light source being able to be modulated in intensity by the image-producing element which is configured to be transmissive or reflective.

6. The device according to claim 5, wherein the light source is accommodated in the measuring head or connected via a light guide to the measuring head.

7. A device for the contactless detection of a three-dimensional contour comprising:
    a projector with an image-producing element and a projection lens for imaging a stripe pattern which can be generated on the image-producing element in an object space;
    a camera arrangement which includes two camera lenses for observing the object space from two different directions, wherein the projector and the camera arrangement are configured together in one measuring head which can be used as a hand-held device; and
    a control and evaluation unit for actuating the image-producing element and for evaluating image data produced by the camera arrangement, the control and evaluation unit being installed with programming technology, wherein the programming technology is configured to generate at least one stripe pattern on the image-producing element, to evaluate a course of phase values determined with the camera arrangement along mutually corresponding epipolar lines in image planes of both camera lenses with respect to constancy, to divide the epipolar lines into intervals of a constant phase course, to identify mutually corresponding intervals in the mutually corresponding epipolar lines, to identify mutually corresponding image points of the same phase values within the intervals identified as correlating with each other, and to triangulate an object point based on the identified image points which correspond to this object point and correlate with each other.

8. A method for the contactless detection of a three-dimensional contour comprising:
    projecting at least one stripe pattern onto an object with a projector with an image-producing element and a projection lens for imaging the at least one stripe pattern which can be generated on the image-producing element in the object space;
    by means of a camera arrangement with two camera lenses disposed at a defined spacing relative to each other for observing the object space from two different directions, wherein the projector and the camera arrangement are configured together in one measuring head which can be used as a hand-held device, recording two images of the object with the stripe pattern projected thereon from two different directions;
    with a control and evaluation unit having programming technology, determining phase values of the stripe pattern for image points in both images;
    determining, by means of triangulation based on respectively mutually corresponding image points in the two images, depth information for an object point corresponding to these image points, wherein determining the mutually corresponding image points in the two images comprises:
selecting pairs of respectively mutually corresponding epipolar lines in the two images;
evaluating the determined phase values along the epipolar lines with respect to constancy;
dividing the epipolar lines into intervals of a constant phase course;
identifying mutually corresponding intervals in the mutually corresponding epipolar lines; and
within the mutually corresponding intervals, mutually assigning points of the same phase values.

9. The method according to claim 8, wherein a sequence of a plurality of mutually phase-shifted stripe patterns is projected in succession onto the object and recorded for determining the phase values.

10. The method according to claim 8, wherein at least one further stripe pattern with differently orientated stripes is projected onto the object in a temporally offset manner, phase values also of this further stripe pattern being evaluated in order to identify mutually corresponding image points in the two images.

11. The method according to claim 8, wherein at least one recording of the object is made my means of the two camera lenses, in the case of which at least one marking which is located in a defined manner relative to the simultaneously, previously or subsequently recorded stripe pattern is projected onto the object for identification of two corresponding image points, which assists one or both of the method and calibration of a device used for the method.

12. The method according to claim 8, wherein the evaluated epipolar lines are situated densely in the two images.

13. The method according to claim 8, wherein a subpixel-precise assignment of image points to phase values is effected by means of interpolation.

14. The method according to one claim 8, wherein all the stripe patterns used for detection of one contour and possibly additionally projected markings are recorded as at least one of within between 100 ms and 500 ms and with an image repeat rate of between 15 Hz and 60 Hz.

15. The method according to claim 8, wherein the object concerns teeth, tooth models or dentures.

* * * * *